US008134982B2

United States Patent
Lee et al.

(10) Patent No.: US 8,134,982 B2
(45) Date of Patent: Mar. 13, 2012

(54) APPARATUS AND METHOD FOR RANDOM ACCESS IN WIRELESS COMMUNICATION SYSTEM

(75) Inventors: Kang-Gyu Lee, Yongin-si (KR); Jeong-Hoon Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 746 days.

(21) Appl. No.: 12/207,418

(22) Filed: Sep. 9, 2008

(65) Prior Publication Data

US 2009/0067404 A1 Mar. 12, 2009

(30) Foreign Application Priority Data

Sep. 11, 2007 (KR) .................. 10-2007-0091965

(51) Int. Cl.
*H04B 7/216* (2006.01)
(52) U.S. Cl. ..................... 370/335; 370/342
(58) Field of Classification Search ............. 370/344, 370/345, 208, 210, 335, 342; 375/140, 260, 375/261, 262, 265, 267
See application file for complete search history.

(56) References Cited

U.S. PATENT DOCUMENTS

| 2005/0030931 A1* | 2/2005 | Sung et al. ............... 370/342 |
| 2005/0041573 A1* | 2/2005 | Eom et al. ............... 370/208 |
| 2007/0082621 A1* | 4/2007 | Lee et al. ............... 455/69 |

FOREIGN PATENT DOCUMENTS

| KR | 10-2005-0089697 A | 9/2005 |
| KR | 10-2006-0038727 A | 5/2006 |
| KR | 10-2006-0063276 A | 6/2006 |
| KR | 10-2006-0066408 A | 6/2006 |

* cited by examiner

*Primary Examiner* — Derrick Ferris
*Assistant Examiner* — Mang Yeung
(74) *Attorney, Agent, or Firm* — Jefferson IP Law, LLP

(57) ABSTRACT

An apparatus and method for random access in a wireless communication system are provided. In the method, a random access response message is received. The random access response message is analyzed to determine a status of a random access process. A count variable value is updated according to the status. And the count variable value is compared with at least one reference value to determine a random access period. By adaptively changing the period of periodic ranging in a wireless communication system, the probability of success is increased while the waste of resources is decreased.

21 Claims, 7 Drawing Sheets

APPARATUS AND METHOD FOR RANDOM ACCESS IN WIRELESS COMMUNICATION SYSTEM

PRIORITY

This application claims the benefit under 35 U.S.C. §119 (a) of a Korean patent application filed in the Korean Intellectual Property Office on Sep. 11, 2007 and assigned Serial No. 2007-91965, the entire disclosure of which is hereby incorporated by reference.

BACKGROUND OF THE INVENTION

1. Field of the Invention

The present invention relates to an apparatus and method for random access in a wireless communication system. More particularly, the present invention relates to an apparatus and method for ranging in a broadband wireless communication system.

2. Description of the Related Art

As known in the art, communication systems were originally developed to provide voice communication services. As technology has evolved, communication systems now provide data services and various multimedia services in addition to the voice communication services. However, conventional communication systems, which were developed to provide only voice communication services, have a narrow bandwidth for data transmission and require a high subscription fee, thus failing to satisfy diversified user demands. Furthermore, in conjunction with the rapid development in the communication industry and ever-increasing demands for Internet services, it is important to provide communication systems capable of providing Internet services efficiently. As a result of these trends, broadband wireless communication systems for providing efficient Internet services have been proposed.

The proposed broadband wireless communication systems use an Orthogonal Frequency Division Multiplexing (OFDM)/Orthogonal Frequency Division Multiple Access (OFDMA) scheme. Thus, the broadband wireless communication systems can provide high-rate data transmission by transmitting physical channel signals using a number of subcarriers. The standardization of wireless access schemes for broadband wireless communication systems is being conducted by the Institute of Electrical and Electronics Engineers (IEEE), which is an international standardization organization, particularly by the IEEE 802.16 standardization group.

Ranging is a kind of random access process in a broadband wireless communication system. The ranging process is used to correct time/frequency offsets between a Base Station (BS) and a Mobile Station (MS) and to correct the transmission (TX) power of a mobile station. The ranging process can be divided into initial ranging, periodic ranging, bandwidth request ranging, and handover ranging, depending on the purpose.

A ranging code (or code set) used in each ranging process is broadcast using an Uplink Channel Descriptor (UCD) message. A mobile station attempts ranging by transmitting an intended ranging code through a ranging region that is allocated using an UpLink (UL)-MAP message. A base station uses the received ranging code to calculate time/frequency offsets, and transmits a RaNGing ReSPonse (RNG-RSP) message containing an offset correction value to the mobile station. That is, through a code ranging process, the mobile station corrects physical time/frequency offsets with the base station. The ranging code transmitted by the mobile station in the ranging process is called a Code Division Multiple Access (CDMA) code. The CDMA code is generated by a Pseudo Random Binary Sequence (PRBS) generator illustrated in FIG. 1.

FIG. 1 is a diagram illustrating a conventional ranging code generator, i.e., a PRBS generator.

Referring to FIG. 1, a polynomial of a PRBS generator is $(1+X1+X4+X7+X15)$, and a CDMA code represents a 144-bit binary sequence generated by the PRBS generator. An initial value (i.e., a seed) of the PRBS generator, i.e., B14~b0 is $(0.0.1.0.1.0.1.1.s0,s1.s2.s3.s4,s5,s6)$, and a specific parameter (i.e., UL_permBase) of a corresponding base station is set for s6:s0. The initial 144-bit sequence output from the PRBS generator is defined as the $0^{th}$ CDMA code, and the next 144-bit sequence constituted by the subsequent $145^{th}$ to $288^{th}$ bits is defined as the first CDMA code. In general, each base station manages 0~25 codes, classifies the 256 codes into several subgroups depending on uses, and broadcasts the use of each subgroup through a UCD message.

The uplink synchronization of a mobile station may deviate when its distance from a base station changes. Also, the uplink synchronization may deviate due to a handover situation or due to the inaccuracy of an oscillator used by the mobile station. Periodic ranging is a process for correcting such a synchronization deviation. In periodic ranging, the mobile station transmits a CDMA code to the base station at preset periods, and corrects a synchronization deviation using a ranging response (RNG-RSP) message received from the base station. For example, the ranging status set in the ranging response message may be SUCCESS, CONTINUE, or ABORT, depending on the degree of an uplink synchronization deviation. If the ranging status is SUCCESS or CONTINUE, the ranging response message may contain correction values of timing, frequency and TX power. Also, because it is difficult to know the position of the mobile station that has transmitted the CDMA code, the ranging response message is encoded using a robust coding scheme so that the mobile station at a cell edge also can receive the ranging response message.

The existing system uses a fixed ranging period without considering the movement of a mobile station or the degree of any synchronization deviation. Periodic ranging aims at achieving uplink synchronization. Therefore, an increase in the frequency of the periodic ranging increases the accuracy of synchronization with a base station and stabilizes the throughput of transmission of user traffic, thus making it possible to expect a satisfactory Quality of Service (QoS). However, if the periodic ranging is performed too frequently, the probability of contention in a ranging region increases, thus interrupting the operations of other mobile stations and wasting radio resources due to the occupation of resources by a ranging response message. On the contrary, if the period of the periodic ranging increases, the probability of a deviation in the uplink synchronization of the mobile station increases, thus causing a delay in the mobile station's ability to transmit traffic until synchronization is acquired.

SUMMARY OF THE INVENTION

An aspect of the present invention is to address at least the above-mentioned problems and/or disadvantages and to provide at least the advantages below. Accordingly, an aspect of the present invention is to provide an apparatus and method for adaptively changing the period of periodic ranging in a wireless communication system.

Another aspect of the present invention is to provide an apparatus and method for increasing the probability of success in a periodic ranging process in a wireless communication system.

Still another aspect of the present invention is to provide an apparatus and method for reducing a waste of resources due to periodic ranging in a wireless communication system.

According to an aspect of the present invention, an apparatus for random access in a wireless communication system is provided. The apparatus includes a message analyzer for analyzing a random access response message received from a base station, a period calculator for determining a status of a random access process according to the analysis, for updating a count variable value according to the status, and for comparing the count variable value with at least one reference value to determine a random access period and a controller for controlling the next random access process according to the determined random access period.

According to another aspect of the present invention, a method for random access in a wireless communication system is provided. The method includes receiving a random access response message from a base station, analyzing the random access response message to determine a status of a random access process, updating a count variable value according to the status and determining a random access period by comparing the count variable value with at least one reference value.

According to still another aspect of the present invention, a method for periodic ranging in a wireless communication system is provided. The method includes transmitting a periodic ranging code from a mobile station to a base station, upon receipt of the ranging code from the mobile station, comparing a time offset of the ranging code with a predetermined error range, determining a ranging status according to the comparison result, and transmitting a ranging response message containing the ranging status from the base station to the mobile station and upon receipt of the ranging response message from the base station, updating a count variable value according to the ranging status contained in the ranging response message and determining a ranging period by comparing the count variable value with at least one reference value.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, well-known functions and constructions are omitted for clarity and conciseness. Also, the terms used herein are defined according to the functions of the present invention. Thus, the terms may vary depending on user's or operator's intentions. Therefore, the terms used herein must be understood based on the descriptions made herein.

Exemplary embodiments of the present invention are intended to provide a scheme for adaptively changing the period of a periodic ranging process in a broadband wireless communication system.

The following description is made in the context of an OFDM-based Broadband Wireless Access (BWA) communication system. However, it is to be understood that this is merely for the sake of convenience and that the present invention is not limited to an OFDM-based system. Thus, it should be clearly understood that the present invention is also applicable to any other communication system that periodically performs a random access process.

Figure 1:
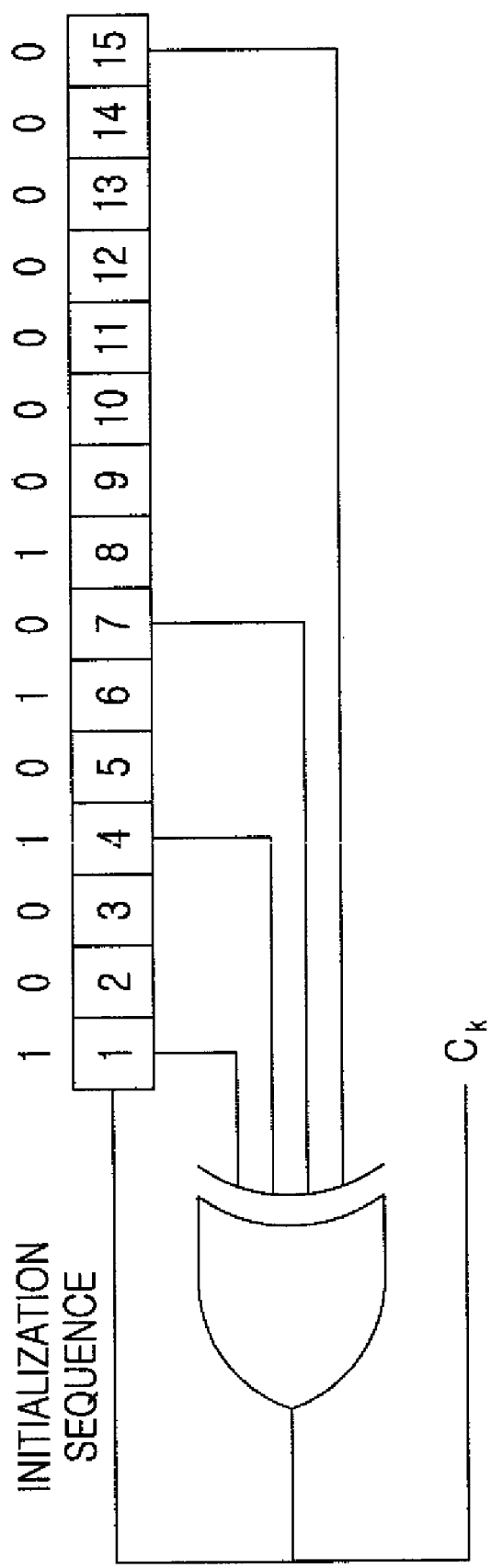
FIG. 1 is a diagram illustrating a conventional ranging code generator.
Figure 2:
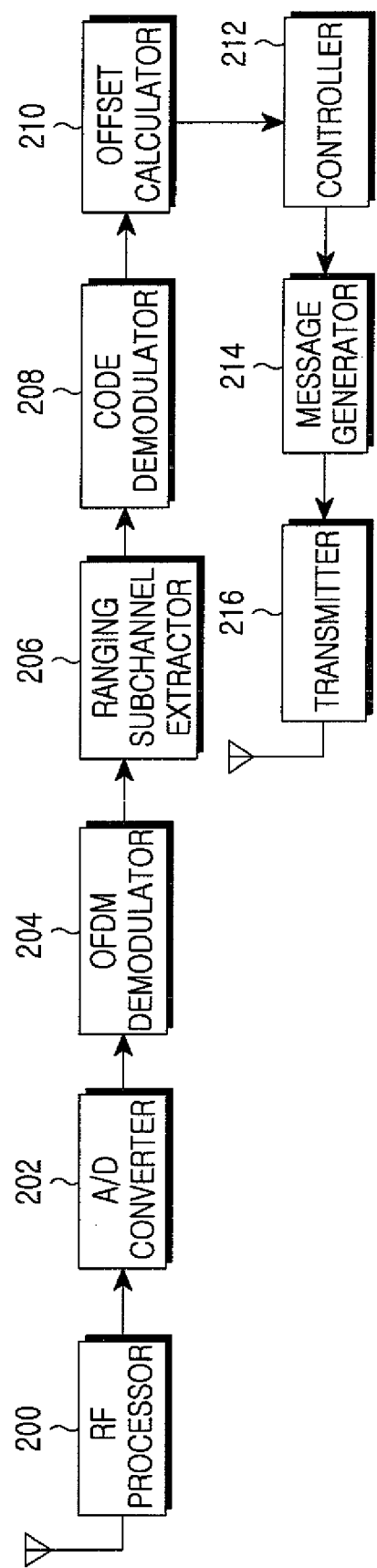
FIG. 2 is a block diagram of a base station in a broadband wireless communication system according to an exemplary embodiment of the present invention.

FIG. 2 is a block diagram of a base station in a broadband wireless communication system according to an exemplary embodiment of the present invention.

Referring to FIG. 2, the base station includes a Radio Frequency (RF) processor 200, an Analog-to-Digital (A/D) converter 202, an OFDM demodulator 204, a ranging subchannel extractor 206, a code demodulator 208, an offset calculator 210, a controller 212, a message generator 214, and a transmitter 216.

The RF processor 200 includes a filter and a frequency converter, and converts an RF signal received through an antenna into a baseband signal. The A/D converter 202 converts the analog baseband signal received from the RF processor 200 into a digital signal (i.e., sample data).

The OFDM demodulator 204 removes a guard interval (e.g., a cyclic prefix) from the sample data received from the A/D converter 202, and Fast Fourier Transform (FFT)-processes the resulting signal to output subcarrier values (i.e., frequency-domain data). The ranging subchannel extractor 206 extracts ranging data from the frequency-domain data received from the OFDM demodulator 204. The following description is given for a case of receiving a periodic ranging code (i.e., a CDMA code) according to an exemplary embodiment of the present invention.

The code demodulator 208 multiplies the data received from the ranging subchannel extractor 206 by preset periodic ranging codes to perform code demodulation. That is, the code demodulator 208 correlates a signal received in a ranging region and each of the periodic ranging codes, and provides a peak-detected code number and a peak value (magnitude and sample position) to the offset calculator 210.

The offset calculator 210 uses the peak value received from the code demodulator 208 to estimate time/frequency offsets, and provides the estimated offset values to the controller 212. The time/frequency offset estimation is well known in the art, and thus its description will be omitted for conciseness. Also, the offset calculator 210 estimates the receive (RX) power (e.g., SINR) of a ranging code, and provides the estimated value to the controller 212.

The controller 212 determines time, frequency and TX power correction values according to the offset values and the RX power value received from the offset calculator 210, and provides the determined correction values to the message generator 214. Also, the controller 212 determines a ranging status according to the time offset value, and provides the determined ranging status to the message generator 214. Herein, if the time offset value is within a preset error range, the ranging status is SUCCESS. If the time offset value is not within a preset error range, the ranging status is CONTINUE or ABORT.

The message generator 214 includes a block for encoding a Media Access Control (MAC) message. The message generator 214 generates a transmission message (e.g., a MAC management message) using the information received from the controller 212. According to an exemplary embodiment of the present invention, the message generator 214 generates a ranging response message using the information received from the controller 212. Herein, if the ranging status is SUCCESS or CONTINUE, the ranging response message may contain the time, frequency and TX power correction values.

The transmitter 216 uses a physical layer encoder to physical-layer-encode the transmission message received from the message generator 214, and transmits the resulting data through an antenna. For example, the transmitter 216 may include a channel coding block (including an encoder and a modulator), a modulation block (including an Inverse Fast Fourier Transform (IFFT) processor), and an RF transmission block.

Figure 3:
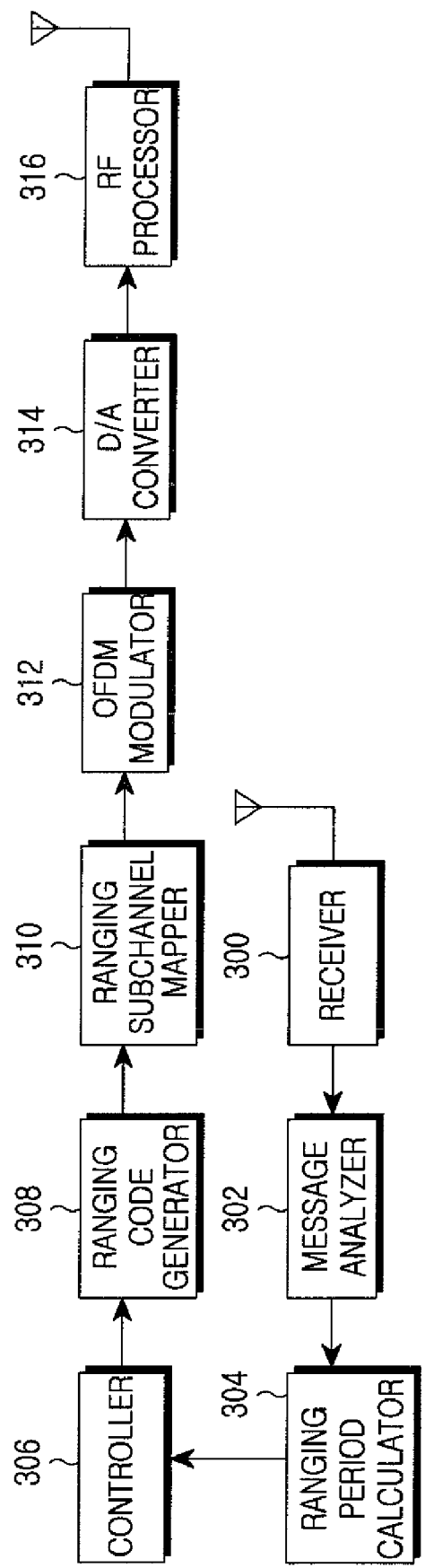
FIG. 3 is a block diagram of a mobile station in a broadband wireless communication system according to an exemplary embodiment of the present invention.

FIG. 3 is a block diagram of a mobile station in a broadband wireless communication system according to an exemplary embodiment of the present invention.

Referring to FIG. 3, the mobile station includes a receiver 300, a message analyzer 302, a ranging period calculator 304, a controller 306, a ranging code generator 308, a ranging subchannel mapper 310, an OFDM modulator 312, a Digital-to-Analog (D/A) converter 314, and an RF processor 316.

The receiver 300 uses a physical layer decoder to physical-layer-decode a signal received through an antenna, and provides the resulting signal to the message analyzer 302. For example, the receiver 300 may include an RF receiving block, a demodulation block (including an FFT processor), and a channel decoding block (including a demodulator and a decoder).

The message analyzer 302 is a block for decoding a MAC message. The message analyzer 302 analyzes a message received from the receiver 300. According to an exemplary embodiment of the present invention, the message analyzer 302 analyzes a ranging response message received from a base station to obtain various data (e.g., correction values and a ranging status), and provides the obtained data to the ranging period calculator 304.

The ranging period calculator 304 increases a count variable N according to the ranging status contained in the ranging response message, and controls the ranging period according to the count variable N. Also, the ranging period calculator 304 provides the determined ranging period value and various correction values in the ranging response message to the controller 306. Herein, if a ranging status of the ranging response message for a ranging code transmitted first in the corresponding period is CONTINUE, the count variable N is increased by '1'. Alternatively, if the ranging status is SUCCESS, the count variable N is decreased by '1'. The ranging period calculator 304 compares the value of the count variable N with an upper reference value (i.e., a first reference value) and a lower reference value (i.e., a second reference value). If the value of the count variable N reaches the first reference value, the ranging period is decreased by a preset step. If the value of the count variable N reaches the second reference value, the ranging period is increased by a preset step. Herein, if the decreased ranging period is smaller than a preset minimum value $T_{min}$, the ranging period is determined as the minimum value. If the increased ranging period is greater than a preset maximum value $T_{max}$, the ranging period is determined as the maximum value.

The controller 306 controls an overall operation of the mobile station. According to an exemplary embodiment of the present invention, if ranging is necessary, the controller 306 orders the ranging code generator 308 to generate a ranging code. For periodic ranging, the controller 306 determines a periodic ranging code transmission time according to the ranging period value received from the ranging period calculator 304, and controls the ranging code generator 308 so that the ranging code can be transmitted at the determined transmission time. Also, the controller 306 controls the TX power and the synchronization of an uplink signal (i.e., a time offset and a frequency offset) on the basis of the correction values of the ranging response message received from the base station.

The ranging code generator 308 manages a code set for each ranging type (e.g., initial ranging, bandwidth request ranging, etc.). The ranging code generator 308 selects a ranging code from the code set for the ranging type (i.e., periodic ranging), and outputs the selected ranging code.

The ranging subchannel mapper 310 maps the ranging code received from the ranging code generator 308 to a ranging region (or resource) and outputs the resulting data. For example, in the case of the IEEE 802.16 system, a plurality of ranging slots may be present in a ranging region for each frame. The mobile station selects a random numeral within a window size (e.g., 16) obtained from an Uplink Channel Descriptor (UCD), and counts a ranging slot equal to the selected numeral, thereby transmitting the ranging code in the corresponding slot.

The OFDM modulator 312 IFFT-processes the resource-mapped ranging code received from the ranging subchannel mapper 310, and inserts a guard interval (e.g., a cyclic prefix) into the resulting sample data to generate an OFDM symbol. The D/A converter 314 converts the baseband sample data received from the OFDM modulator 312 into an analog signal. The RF processor 316 converts the baseband analog signal received from the D/A converter 314 into a transmittable RF signal, and transmits the RF signal through an antenna.

Figure 4:
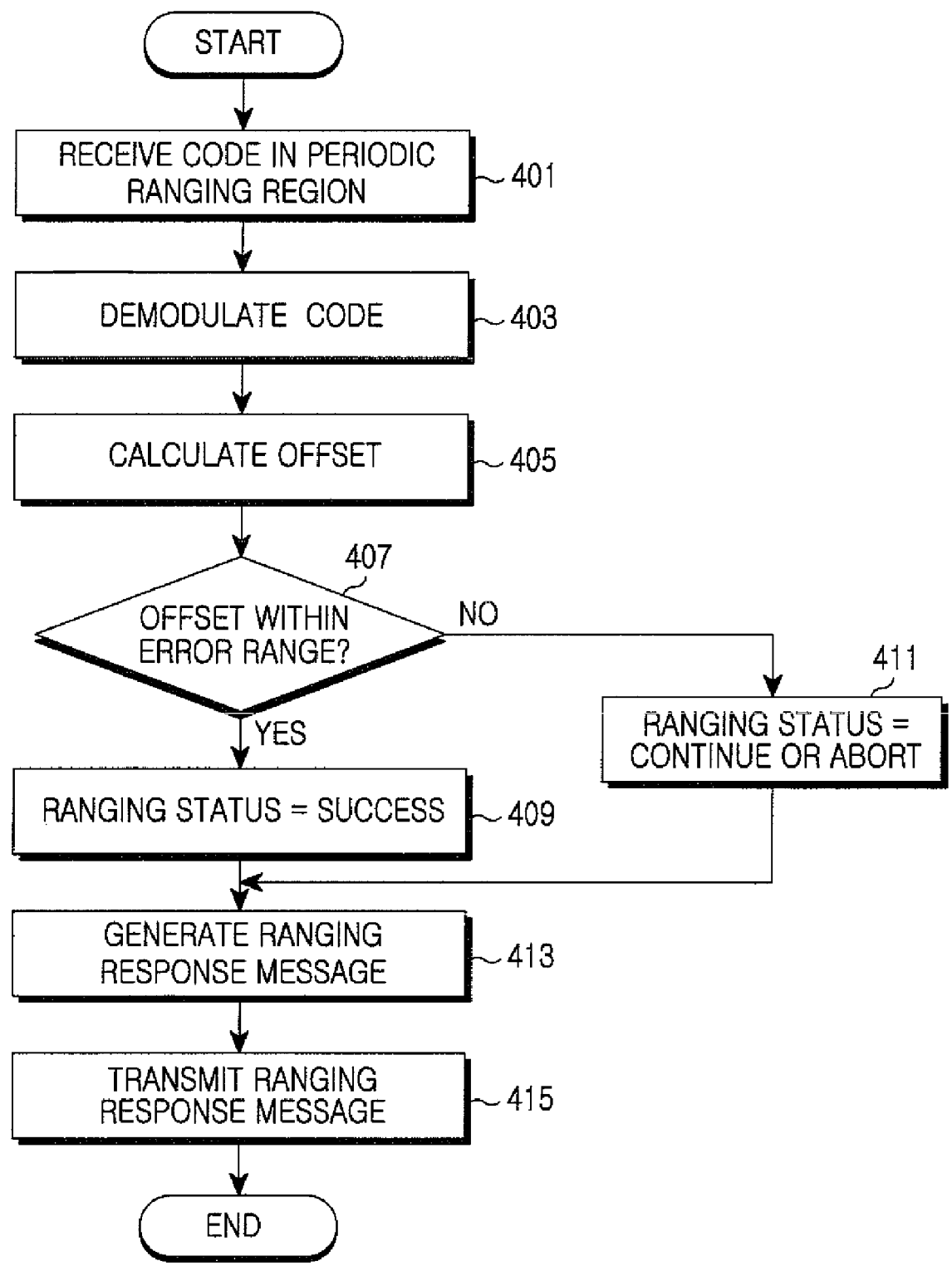
FIG. 4 is a flow diagram illustrating an operation of a base station in a broadband wireless communication system according to an exemplary embodiment of the present invention.

FIG. 4 is a flow diagram illustrating an operation of the base station in the broadband wireless communication system according to an exemplary embodiment of the present invention.

Referring to FIG. 4, the base station extracts a received signal from a periodic ranging region, in step 401. That is, the base station OFDM-demodulates a received signal to obtain frequency-domain data, and extracts data mapped with a ranging signal (or a ranging code) from the frequency-domain data.

In step 403, the base station correlates the extracted data and preset periodic ranging codes to perform code demodulation. That is, the base station correlates the received signal in the ranging region and each of the periodic codes, and obtains a peak-detected code and a peak value (magnitude and sample position).

In step 405, the base station uses the peak value, etc. to estimate time/frequency offsets and RX power. The offset/RX power estimation is well known in the art, and thus its description will be omitted for conciseness.

In step 407, the base station determines whether the time offset value is within a preset error range. If the time offset value is within the preset error range, the base station proceeds to step 409 to determine a ranging status set in a ranging response message as SUCCESS, and then proceeds to step 413. On the other hand, if the time offset value is not within (i.e., deviates from) the preset error range, the base station proceeds to step 411 to determine the ranging status as CONTINUE or ABORT according to the deviation degree and the system conditions, and then proceeds to step 413.

In step 413, the base station generates a ranging response message according to the determined ranging status. Herein, if the ranging status is SUCCESS or CONTINUE, the ranging response message may contain the time, frequency and TX power correction values for an uplink signal. Also, because the base station does not know a mobile station that has transmitted the ranging code, it may include information (e.g., a code number and region information) about a ranging code that is detected by the base station, in the ranging response message. In step 415, the base station transmits the generated ranging response message to the mobile station.

Figure 5A:
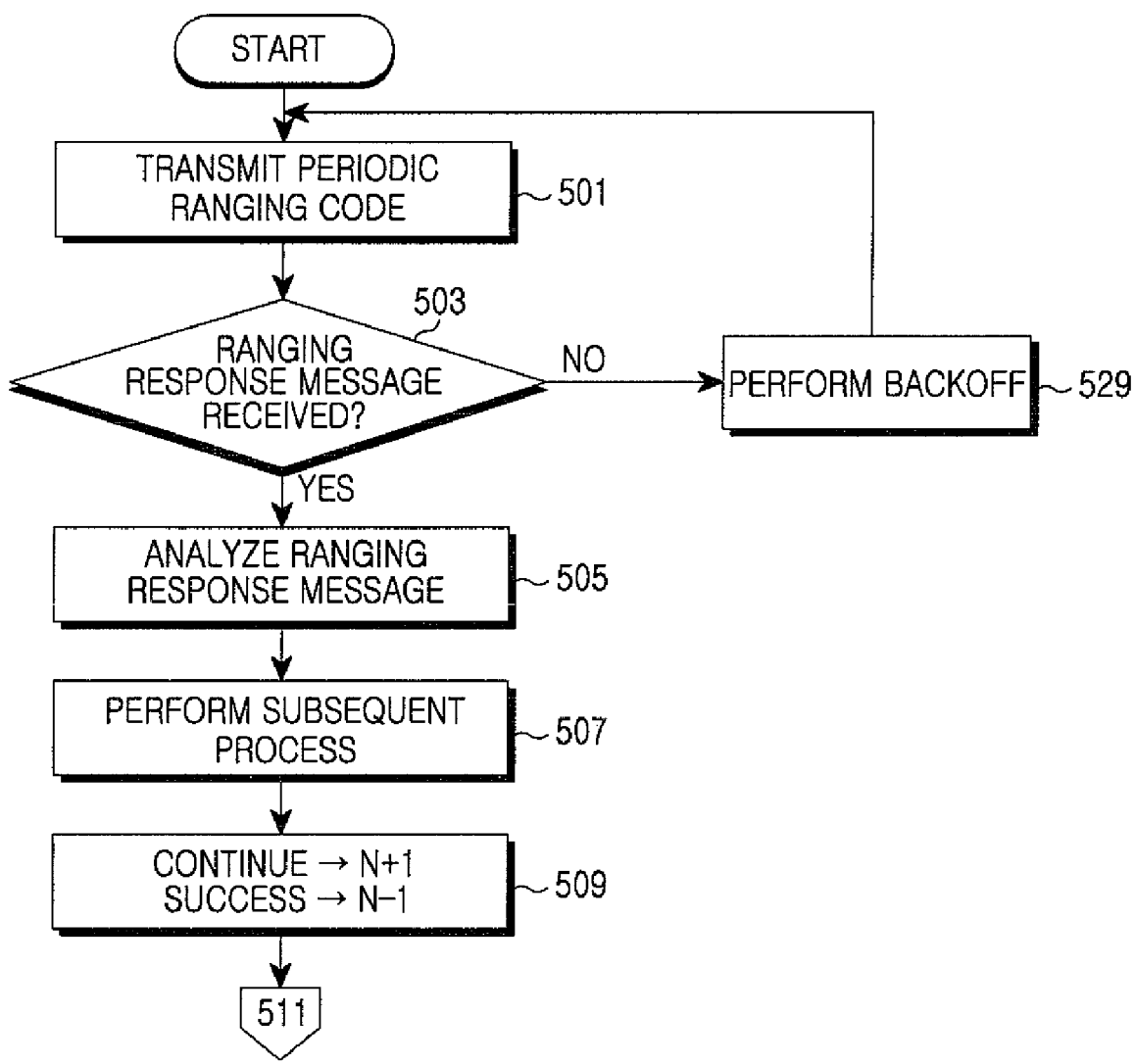
FIGS. 5A and 5B are a flow diagram illustrating an operation of a mobile station in a broadband wireless communication system according to an exemplary embodiment of the present invention.
Figure 5B:
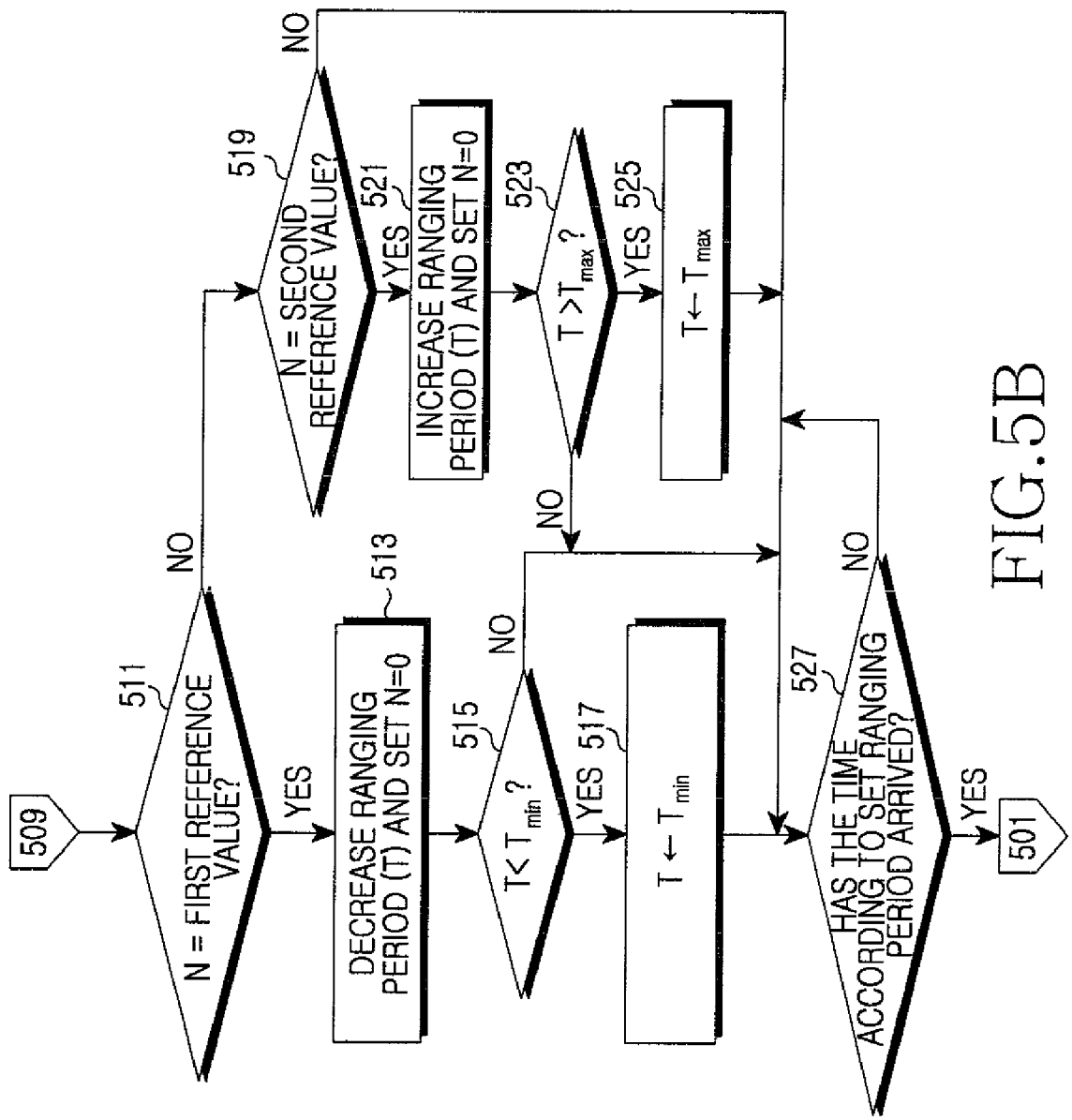

FIGS. 5A and 5B are a flow diagram illustrating an operation of a mobile station in a broadband wireless communication system according to an exemplary embodiment of the present invention.

Referring to FIGS. 5A and 5B, in step 501, the mobile station selects a random code from a code set for periodic ranging, maps the selected code to a ranging region (or resource), and transmits the resulting data to the corresponding base station.

In step 503, the mobile station determines whether a ranging response message is received in response to the transmitted ranging code. If the ranging response message is not received within a preset time, the mobile station performs backoff in step 529 and then returns to step 501 in order to transmit a ranging code. If the ranging response message is received, the mobile station analyzes the ranging response message to obtain various data, in step 505. Herein, the ranging response message may contain the time, frequency and RX power correction values for an uplink signal.

In step 507, the mobile station performs the subsequent ranging process according to a ranging status set in the ranging response message. For example, if the ranging status is SUCCESS, the mobile station completes the ranging process and applies the correction values obtained from the ranging response message to an uplink. If the ranging status is CONTINUE, the mobile station applies the correction values obtained from the ranging response message to again transmit a ranging code to the base station. Also, if the ranging status is ABORT, the mobile station aborts the ranging process.

In step 509, the mobile station increases or decreases a count variable N according to the ranging status set in the ranging response message. If a ranging status of the ranging response message for a ranging code transmitted first in the corresponding period is CONTINUE, the mobile station increases the count variable N by '1'. If the ranging status is SUCCESS, the mobile station decreases the count variable N by '1'.

In step 511, the mobile station determines whether the value of the count variable N reaches a first reference value (i.e., an upper reference value). If the value of the count variable N reaches the first reference value, the mobile station decreases the current ranging period T by a preset step and initializes the value of the count variable N to '0', in step 513. In step 515, the mobile station determines whether the decreased ranging period is smaller than a preset minimum value $T_{min}$. If the decreased ranging period is equal to or greater than the minimum value $T_{min}$, the mobile station directly proceeds to step 527. On the other hand, if the decreased ranging period is smaller than the minimum value $T_{min}$, the mobile station sets the ranging period T to the minimum value $T_{min}$ in step 517 and then proceeds to step 527.

In step 519, the mobile station determines whether the value of the count variable N reaches a second reference value (i.e., a lower reference value). If the value of the count variable N reaches the second reference value, the mobile station increases the current ranging period T by a preset step and initializes the value of the count variable N to '0', in step 521. In step 523, the mobile station determines whether the increased ranging period is greater than a preset maximum value $T_{max}$. If the increased ranging period is equal to or smaller than the maximum value $T_{max}$, the mobile station directly proceeds to step 527. On the other hand, if the increased ranging period is greater than the maximum value $T_{max}$, the mobile station sets the ranging period T to the maximum value $T_{max}$ in step 525 and then proceeds to step 527. If it is determined that the value of the count variable N does not reach the second reference value in step 519, the mobile station maintains the current ranging period T and proceeds to step 527.

In step 527, the mobile station determines whether the code transmission time according to the ranging period T has arrived. If the code transmission time has arrived, the mobile station returns to step 501 to again perform the subsequent steps.

In the above-described exemplary embodiment, the value of the count variable N is increased or decreased according to the ranging status of the ranging response message for the ranging code transmitted first in the corresponding period. The period of periodic ranging is decreased when the value of the count value N reaches the upper reference value, increased when the value of the count value N reaches the lower reference value and maintained at its current level when the value of the count value N reaches neither the upper reference value nor the lower reference value.

In another exemplary embodiment, the successive occurrence frequency of a ranging process transmitting a ranging code two or more times is counted, and the ranging period is reduced when the count value is greater than a preset reference value. That is, the period of periodic ranging is decreased because the successive occurrence of the ranging process transmitting the ranging code two or more times corresponds to a large movement of the mobile station. On the contrary, the successive occurrence frequency of a ranging process transmitting a ranging one time is counted, and the ranging period is increased when the count value is greater than a preset reference value. That is, the period of periodic ranging is increased because the successive occurrence of the ranging process transmitting the ranging code one time corresponds to a small movement of the mobile station.

Figure 6A:
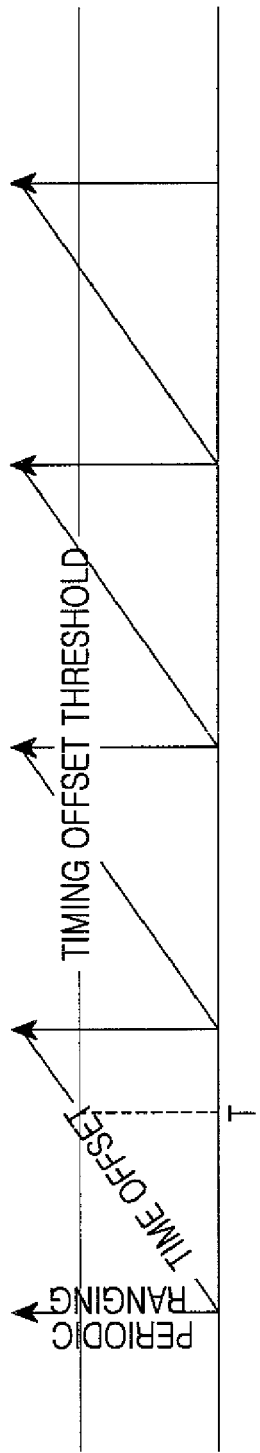
FIGS. 6A, 6B and 6C are a diagram comparing periodic ranging according to an exemplary embodiment of the present invention with conventional periodic ranging.
Figure 6B:
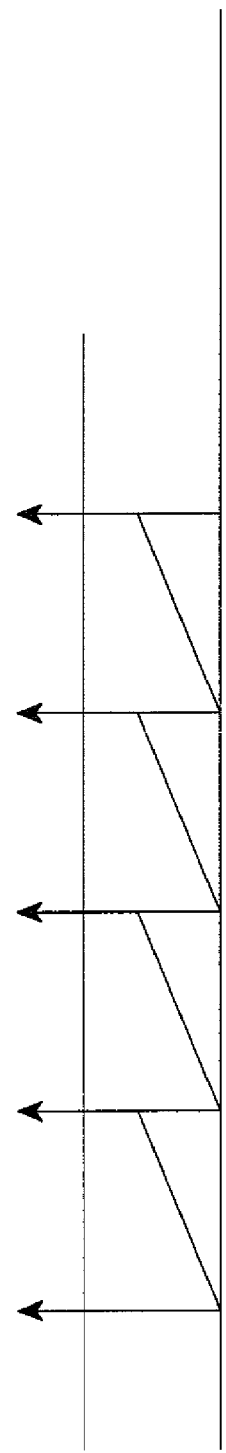
Figure 6C:
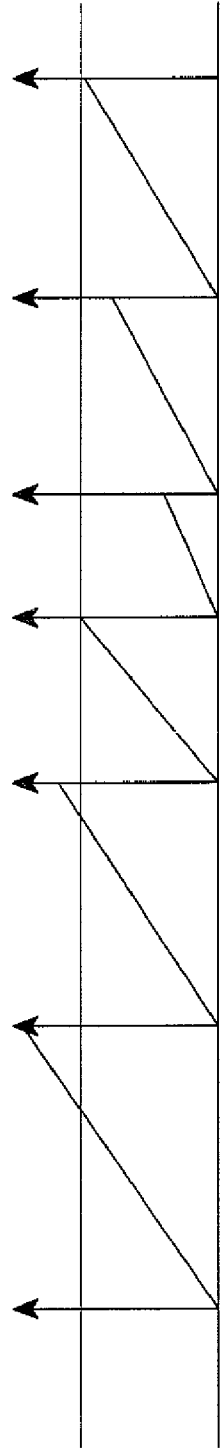

FIGS. 6A, 6B and 6C are a diagram comparing periodic ranging according to an exemplary embodiment of the present invention with conventional periodic ranging.

FIGS. 6A and 6B illustrate periodic ranging with a fixed ranging period, and FIG. 6C illustrates a periodic ranging according to an exemplary embodiment of the present invention whose ranging period changes adaptively.

FIG. 6A illustrates a case where, because the ranging period is too large, ranging is attempted after a time offset of a mobile station exceeds a timing offset threshold required by a base station. In this case, the ranging must be attempted at the time when the time offset is smaller than the timing offset threshold (<T), in order to be able to complete the ranging process by one-time code transmission. However, if ranging is attempted at the time when the time offset is greater than the timing offset threshold, at least two-time code transmissions are needed, thus increasing a signaling load excessively.

FIG. 6B illustrates a case where, because the ranging period is too small, ranging is attempted too frequently in spite of the presence of a margin in the time offset of a mobile station. In this case, the synchronization with a base station can be accurately acquired. However, resources are wasted due to frequent signaling operations, thus increasing the ranging code contention probability.

FIG. 6C illustrates a case where the ranging period is changed adaptively according to an exemplary embodiment of the present invention. For descriptive convenience, it is illustrated that the ranging period is decreased if the ranging process is not completed by one-time code transmission and the ranging period is increased if the ranging process is completed by one-time code transmission. In this way, if the ranging period is changed adaptively according to the mobility of the mobile station, it is possible to solve the problems of the cases of FIGS. 6A and 6B, such as excessive signaling, wasted resources, and code contention.

As described above, exemplary embodiments of the present invention adaptively change the period of periodic ranging for a mobile station. In an exemplary implementation, the period is changed on the basis of the fact the periodic ranging must be frequently performed for a mobile station with a large movement, and the period of the periodic ranging may be large for a mobile station with a small movement. Thus, exemplary embodiments of the present invention may reduce the amount of resources wasted by unnecessary ranging and increase the ranging success probability.

Although the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus for random access in a wireless communication system, the apparatus comprising:
   a message analyzer for analyzing a random access response message;
   a period calculator for determining a status of a random access process according to the analysis, for updating a count variable value by increasing or decreasing the count variable value by a numerical value according to the status, for comparing the count variable value with at least one of an upper reference value and a lower reference value to determine a random access period, for decreasing the random access period if the count variable value reaches the upper reference value, and for increasing the random access period if the count variable value reaches the lower reference value; and
   a controller for controlling a next random access process according to the determined random access period.

2. The apparatus of claim 1, wherein the random access process comprises a periodic ranging process.

3. The apparatus of claim 1, wherein the random access response message comprises a response message to a random access code transmitted first in a corresponding period.

4. The apparatus of claim 1, wherein the period calculator increases the count variable value if the status comprises CONTINUE, and decreases the count variable value if the status comprises SUCCESS.

5. The apparatus of claim 1, wherein the period calculator determines whether the random access period is within a preset range, and converges the random access period to one of a maximum and a minimum value of the preset range if the random access period deviates from the preset range.

6. The apparatus of claim 1, wherein the controller applies correction values received in the random access response message to an uplink signal.

7. The apparatus of claim 6, wherein the correction values include at least one of a time correction value, a frequency correction value, and a transmission (TX) power correction value.

8. The apparatus of claim 1, further comprising:
   a code generator for generating a random access code at the time according to the determined period;
   a modulator for Orthogonal Frequency Division Multiplexing (OFDM)-modulating the random access code received from the code generator;
   a Digital-to-Analog (D/A) converter for converting the data received from the modulator into an analog signal; and
   a Radio Frequency (RF) processor for converting the data received from the D/A converter into an RF signal.

9. A method for random access in a wireless communication system, the method comprising:
   receiving a random access response message;
   analyzing the random access response message to determine a status of a random access process;
   updating a count variable value by increasing or decreasing the count variable value by a numerical value according to the status;
   determining a random access period by comparing the count variable value with at least one of an upper reference value or a lower reference value; and
   decreasing the random access period if the count variable value reaches the upper reference value, and increasing the random access period if the count variable value reaches the lower reference value.

10. The method of claim 9, further comprising controlling a next random access process according to the determined random access period.

11. The method of claim 9, wherein the random access process comprises a periodic ranging process.

12. The method of claim 9, wherein the random access response message comprises a response message to a random access code transmitted first in a corresponding period.

13. The method of claim 9, wherein the updating of the count variable value comprises:
   increasing the count variable value if the status is CONTINUE; and
   decreasing the count variable value if the status is SUCCESS.

14. The method of claim 9, wherein the determining of the random access period further comprises:
   determining whether the random access period is within a preset range; and converging the random access period to a minimum value of the preset range if the random access period deviates from the preset range.

15. The method of claim 9, wherein the determining of the random access period further comprises:
   determining whether the random access period is within a preset range; and
   converging the random access period to a maximum value of the preset range if the random access period deviates from the preset range.

16. The method of claim 9, further comprising applying correction values received in the random access response message to an uplink signal.

17. The method of claim 16, wherein the correction values comprise at least one of a time correction value, a frequency correction value, and a TX power correction value.

18. The method of claim 9, further comprising:
   selecting a random access code at the time according to the determined period;
   Orthogonal Frequency Division Multiplexing (OFDM)-modulating the selected random access code; and
   converting the OFDM-modulated data into a Radio Frequency (RF) signal.

19. A method for periodic ranging in a wireless communication system, the method comprising:
   transmitting a periodic ranging code from a mobile station to a base station;
   upon receipt of the ranging code from the mobile station, comparing a time offset of the ranging code with a preset error range, determining a ranging status according to the comparison result, and transmitting a ranging response message containing the ranging status from the base station to the mobile station; and
   upon receipt of the ranging response message from the base station, updating a count variable value according to the ranging status contained in the ranging response message and determining a ranging period by comparing the count variable value with at least one reference value,
   wherein the determining of the ranging period comprises:
      updating a count variable value according to the ranging status;
      comparing the count variable value with at least one of an upper reference value and a lower reference value; and
      decreasing the ranging period if the count variable value reaches the upper reference value, and increasing the ranging period if the count variable value reaches the lower reference value.

20. The method of claim 19, wherein the determining of the ranging period further comprises:
   determining whether the ranging period is within a preset range; and
   converging the ranging period to at least one of a maximum and a minimum value of the preset range if the ranging period deviates from the preset range.

21. The method of claim 19, further comprising controlling, by the mobile station, the next periodic ranging process according to the determined ranging period.

* * * * *